United States Patent [19]

Haas

[11] 4,293,354

[45] Oct. 6, 1981

[54] PROCESS AND MACHINE FOR FASTENING A CLOSURE MEMBER TO A CONTAINER

[75] Inventor: Richard G. Haas, South Haven, Mich.

[73] Assignee: Brown Company, Kalamazoo, Mich.

[21] Appl. No.: 71,243

[22] Filed: Aug. 30, 1979

[51] Int. Cl.[3] ....................... B29C 27/12; B30B 15/34; B65B 7/28

[52] U.S. Cl. ....................................... 156/69; 29/788; 53/330; 53/366; 53/486; 53/488; 156/583.91

[58] Field of Search .................... 29/788; 53/330, 331, 53/366, 486, 488, 489; 156/69, 583.91

[56] References Cited

U.S. PATENT DOCUMENTS

| | | | |
|---|---|---|---|
| 2,798,654 | 7/1957 | Gibbs | 156/69 X |
| 2,975,575 | 3/1961 | Nalbach et al. | 53/330 |
| 3,160,542 | 12/1964 | Foye | 156/69 |
| 3,668,824 | 6/1972 | Solomonov et al. | 53/330 |
| 4,189,824 | 2/1980 | Dillon et al. | 29/788 X |

*Primary Examiner*—Robert A. Dawson

*Attorney, Agent, or Firm*—Gordon W. Hueschen

[57] ABSTRACT

A machine and process useful for fastening a closure member to a container with an upstanding tubular wall, an end edge of which is folded over onto itself to form a folded-over, reinforced portion of double thickness at that end, the closure member having an upstanding tubular inner wall conforming to the inner surface of the folded-over, reinforced portion and a downstanding tubular outer wall connected thereto and conforming to the outer surface of the folded-over, reinforced portion, thereby forming a tubular channel in which the folded-over, reinforced portion is seated in frictional engagement, which comprises a dish-shaped fastening head adapted to be positioned around the closed end of the container with an upstanding side wall in contact with the side wall of the closure member and functioning as an anvil, and radially-moveable punching points for punching selected portions of the upstanding tubular inner wall of the channel into the inner surface of the folded-over, reinforced portion against the portions of the side wall of the fastening head which are apposed to the selected portions. Means are described for effecting relative movement of the fastening head onto and off of the closure member and for actuating the punching points. Also, heating elements are provided to heat the punching points.

32 Claims, 12 Drawing Figures

PROCESS AND MACHINE FOR FASTENING A CLOSURE MEMBER TO A CONTAINER

FIELD OF INVENTION AND PRIOR ART

The invention relates to a machine and process useful for fastening a closure member to a container with an upstanding tubular wall, an end edge of which is folded over onto itself to form a folded-over, reinforced portion of double thickness at that end, the closure member having an upstanding tubular inner wall conforming to the inner surface of the folded-over, reinforced portion and a downstanding tubular outer wall connected thereto and conforming to the outer surface of the folded-over, reinforced portion, thereby forming a tubular channel in which the folded-over, reinforced portion is seated in frictional engagement, which container is particularly adapted for the packaging of ice cream and the like.

Heretofore, ice cream and the like have been packaged in fiberboard containers. One such container comprises a tubular body of rectangular cross-section in which the ends are closed by flaps. Another such container is tubular, but circular in cross-section, has one end permanently closed, and the other closed by a friction-type cover.

The machine and process of the invention is particularly useful in closing containers which have a tubular body of rectangular cross-section, closed at the bottom by flaps in the usual manner, and at the top by a friction closure member made of light plastic material. Heretofore, it has been difficult, if not impossible, to make such a container because of the difficulty of effecting an adequate seal between the open end of the fiberboard container and the friction-type plastic closure. This problem has been solved by forming the container with an upstanding tubular wall, an end edge of which is folded over onto itself to form a folded-over, reinforced portion of double thickness at that end and by providing a closure member having an upstanding tubular wall conforming to the inner surface of the folded-over, reinforced portion and a tubular downstanding wall connected thereto and conforming to the outer surface of the folded-over, reinforced portion, thereby forming a tubular channel in which the folded-over, reinforced portion is seated in frictional engagement, and in which portions of the upstanding tubular wall are pressed into engagement with the inner surface of the folded-over, reinforced portion. This invention is directed to a machine and a process for effecting the closure of this type of container.

OBJECTS OF THE INVENTION

An object of the invention is to provide a machine and process useful for fastening a closure member to a container of the class described. A further object is to provide such a machine and process which effects a closure effective to seal the container against leakage and accidental displacement of the cover and yet to provide for ready, intentional removal thereof. Further objects of the invention is to avoid the disadvantages of the prior art and to obtain such advantages as will appear as the description proceeds.

BRIEF DESCRIPTION OF THE INVENTION

The invention relates to a machine and process useful for fastening a closure member to a container with an upstanding tubular wall, an end edge of which is folded over onto itself to form a folded-over, reinforced portion of double thickness at that end, the closure member having an upstanding tubular inner wall conforming to the inner surface of the folded-over, reinforced portion and a downstanding tubular outer wall connected thereto and conforming to the outer surface of the folded-over, reinforced portion, thereby forming a tubular channel in which the folded-over, reinforced portion is seated in frictional engagement, and is particularly directed to a machine which comprises a fastening head, anvil means, positioning means for positioning the fastening head and the anvil means in fastening position with the downstanding tubular outer wall of the channel juxtaposed to the anvil means and with the upstanding tubular inner wall of the channel apposed to said fastening head, and actuating means for actuating the fastening head, while it is in fastening position, to fasten the upstanding inner tubular wall of the channel to the inner surface of the folded-over, reinforced portion, the fastening head comprising means for pressing selected portions of the upstanding tubular inner wall of the channel into the inner surface of the folded-over, reinforced portion against anvil means apposed to the selected portions.

Advantageously, the fastening head comprises a plurality of punching points arranged about the periphery of the fastening head and the actuating means comprises punching means for causing the punching points to move radially outward and to punch the upstanding tubular inner wall of the tubular channel into the inner surface of the folded-over, reinforced portion of the upstanding tubular wall of the container.

It is of advantage to provide, in the inner surface of the folded-over, reinforced portion, areas of low resistance to the punching-in of the upstanding tubular inner wall of the tubular channel, which areas of low resistance are opposite the punching points and in which the punching means is operative to punch the portions of the upstanding tubular inner wall which are apposed to the areas of low resistance into the same. These areas of low resistance can comprise cut-out areas in the inner layer of the folded-over, reinforced portion, or cut areas therein. In the first embodiment, the cut-out areas form depressions into which the upstanding tubular inner wall is punched, whereas in the other modification, the cut areas provide areas of weakness into which the upstanding tubular inner wall is punched.

Advantageously, the punching points are provided with heating means so that the upstanding tubular inner wall of the closure member, when pressed into the inner surface of the folded-over, reinforced area, is heat deformed therein. This is of particular advantage when the closure member is made of a thermoplast and still more particularly of advantage when areas of low resistance are incorporated in the inner surface of the folded-over, reinforced portion. These are of particular advantage when the cut-out areas are provided with predeposited hot-melt adhesive which is most advantageously effected when a hot-melt adhesive is used to secure the folded-over portion to the upstanding tubular wall of the container, so that portions of the hot-melt adhesive are left in the cut-out areas. Also, when cut areas are provided in the reinforced portion, and hot-melt adhesive is used, when the cut portions are pushed in by heated punching points, hot-melt adhesive will ooze up through the cut portions. Thus, in either modification, the punched-in portions of the upstanding tubular inner wall become adhesively bound in the areas of low resistance.

Advantageously, the positioning means comprises a dish-shaped member having an inner wall complementary in shape to the downstanding tubular outer wall and functioning, first, to position the container and, second, as the anvil means.

In a preferred form of the invention, the fastening head is mounted on a vertically-reciprocable platform and the positioning means comprises reciprocable means for causing the platform to reciprocate. Advantageously, the reciprocable means is double acting, acting first to move the reciprocable platform into a position in which the fastening head is disposed in the dish-shaped member and then to move the actuating means. It is of advantage to mount the actuating means on a second reciprocable platform separated from the first reciprocable platform by spring means and to have the reciprocable means act directly on the second-named platform and indirectly through the spring means on the first-named reciprocable platform.

In the preferred form of the invention, each of the punching points is mounted adjacent the end of a pivoted arm. Advantageously, each arm is pivoted adjacent the periphery of the fastening head and has a portion extending radially to the punching points. Also, it is of advantage to have the pivoted arms comprise a crank adapted to be engaged by the actuating means. Advantageously, the crank comprises a flat surface which extends radially inwardly from the pivot point and which is adapted to be engaged by the punching means which, suitably, are reciprocable rods.

It is of advantage also for the fastening head to comprise a positioning portion having a transverse bottom and a side wall extending upwardly therefrom, which side wall is complementary in size and shape to the downstanding tubular outer wall of the tubular channel, so that the container fits therein and is supported against radial movement, and a mounting portion below the positioning portion having a plurality of yokes in which the arms are pivoted, and having a plurality of axially-disposed apertures through which the arms extend axially to the punching points.

It is also of advantage to have the fastening head mounted on a transverse, axially-reciprocable platform with the reciprocable rods mounted on a second transverse, axially-reciprocable platform and projecting axially through the first platform, the two platforms being separated by spring means and the position-means comprising an axially-reciprocable member fastened to the second platform and operative to cause it to reciprocate axially with the spring means functioning to cause the two platforms to move as a unit until the positioning portion of the fastening head has engaged the container and thereafter to allow the second platform to continue the axial movement until the rods have engaged the flat surface of the crank and caused the arms to rotate about their pivots and to cause the punch points on the arms to punch the upstanding tubular inner wall into the inner surface of the folded-over, reinforced portion.

In order to effect the desired heating of the punching points, a heating element can be disposed in transverse bores in the fastening head or in generally axially-disposed bores in the pivoted arms.

In a preferred form of the invention, the two platforms are mounted to reciprocate on axially-disposed rods affixed to a base member and are actuated by a pressure-fluid cylinder acting between the base and the second platform. Advantageously, the two platforms are connected together by means of a lost-motion connection whereby, when the fluid-pressure cylinder is actuated to retracted position, it will positively retract the first platform and positively withdraw the positioning portion from engagement with the container. Advantageously, the last-named platform has tubular members affixed adjacent the ends thereof which surround the axially-disposed rods and have sealing bushings at each end and means whereby a lubricant can be introduced into the space between the bushings.

In accordance with a preferred form of the invention, the dish-shaped member which functions as a positioning means and as an anvil means is mounted at the bottom of a vertical column for reciprocation up and down, relative to a base member, which column is provided with a sleeve reciprocable thereon and affixed thereto by a lost-motion connection, the reciprocable rods being fastened to this sleeve, and the sleeve being actuated to reciprocate by means of a fluid-pressure system which operates through a parallelogram, one leg of which is the sleeve. Advantageously, the centrally-disposed, axially-reciprocable rod acts to push the container from the positioning portion in the event that it does not automatically release when the column is retracted. Also, suitable means is provided for positioning the container under the fastening head, so that the positioning portion can be lowered onto the closed end thereof.

The invention is also particularly directed to a process for fastening a closure member of the class described to a container of the class described which comprises positioning the end of the container with the closure member thereon in a position juxtaposed to a fastening head and anvil means, effecting a relative movement of the container with respect to the fastening head and the anvil means operative to seat the fastening head on the closed end of the container with the upstanding tubular inner wall of the tubular channel apposed to the fastening head and the downstanding tubular outer wall of the tubular channel juxtaposed to the anvil means, and then actuating the fastening head to fasten the upstanding tubular inner wall to the inner surface of the folded-over reinforced portion by pressing selected portions of the upstanding tubular inner wall into the inner surface of the folded-over, reinforced portion against anvil means apposed to the selected portions. Advantageously, the fastening of the closure member is effected by punching-in portions of the upstanding tubular inner wall of the tubular channel into the inner surface of the folded-over, reinforced portion, which, advantageously, has areas of low resistance to the punching-in of the upstanding tubular inner wall into which the corresponding portions of that wall are punched. As above-described, these areas of low resistance can be cut-out areas or cut areas.

In the preferred form of the invention, the closure member is formed of thermoplast and the punching is effected with heating, whereby the punched-in portions of the upstanding tubular inner wall of the tubular channel are heat-deformed. Also, it is of advantage to effect a gluing of the punched-in portions in the areas of low resistance, advantageously, by means of a predeposited adhesive.

In a preferred process according to the invention, the container is positioned under the fastening head with the closure member up, the head lowered onto the closed end, the anvil means placed against the downstanding tubular outer wall of the tubular channel opposite each area of low resistance, and the upstanding tubular inner wall of the tubular channel punched into the areas of low resistance against the anvil means. When a hot-melt adhesive is used, the punched-in portions are heated until the adhesive is melted and a bond is effected between it and the punched-in portions.

In another preferred process according to the invention, the container is positioned over the fastening head with the closure member down, the head raised onto the closed end, the anvil means placed against the downstanding tubular outer wall of the tubular channel opposite each area of low resistance, and the upstanding tubular inner wall of the tubular channel punched into the areas of low resistance against the anvil means. When a hot-melt adhesive is used, the punched-in portions are heated until the adhesive is melted and a bond is effected between it and the punched-in portions.

Advantageously, the punching points are spring-actuated to retracted position.

FIG. **7*a*** is a detailed view of another modification of the container.

Figure 8:
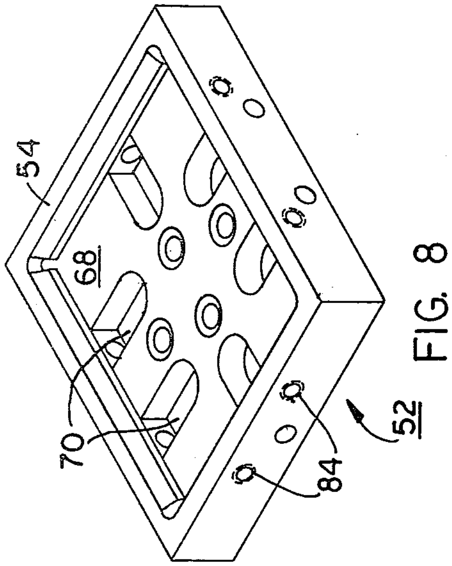

FIG. 8 is an isometric view of the positioning block and anvil.

Figure 9:
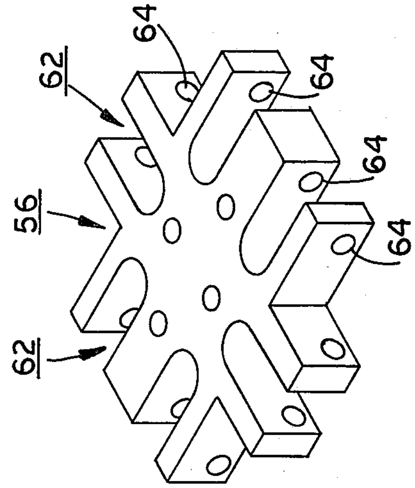

FIG. 9 is an isometric view of the yoke.

Figure 10:
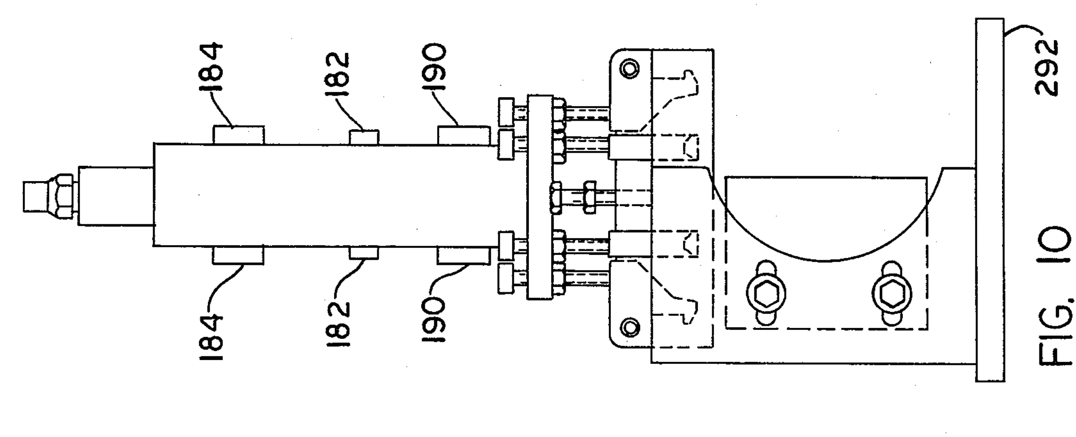

FIG. 10 is a front elevation of another form of the invention.

Figure 11:
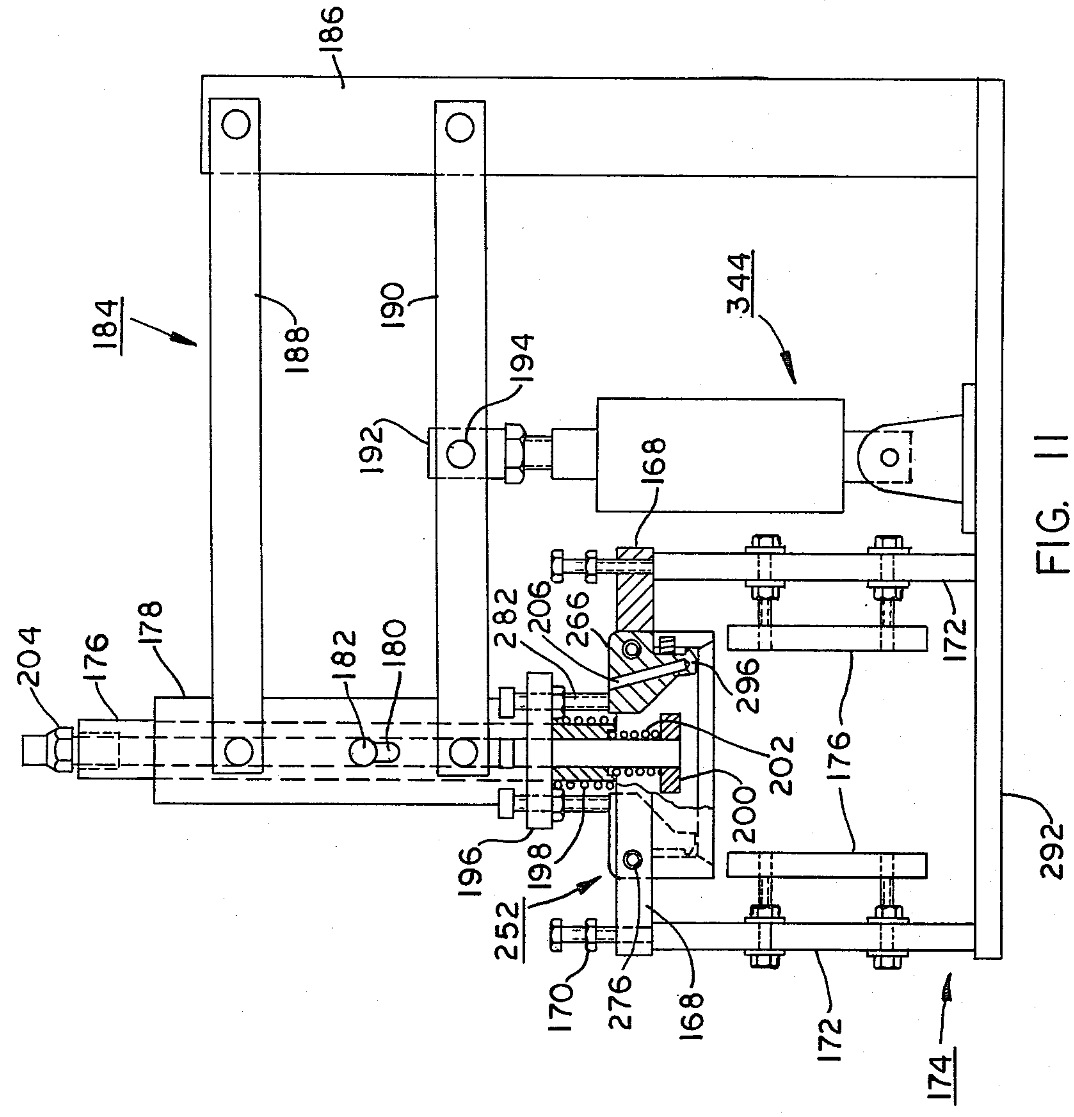

FIG. 11 is a side elevation of FIG. 10.

DETAILED DESCRIPTION OF THE INVENTION

In the modification shown in FIGS. 1 through 8, 10 designates a container of the class described. This container has an upstanding tubular wall 12 comprised of four flat sides and having a rectangular cross-section. The bottom of the container 10 is closed by any suitable closure means, such as flaps, in a manner already well known in the art.

Figure 7:
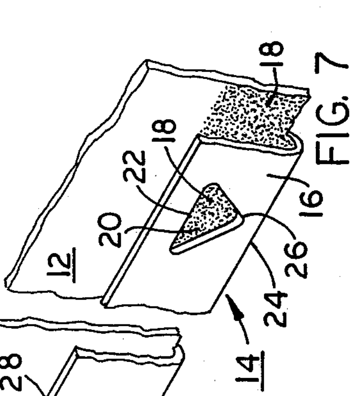
FIG. 7 is a detailed view of one modification of the container.
Figure 7A:
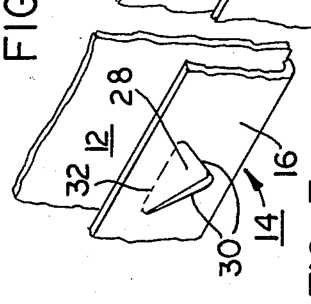

The top edge of the container wall 12 (shown in the down position in these figures) is folded over onto itself, as shown in FIGS. 7 and **7*a*, to provide a portion 14 of double thickness. The folded-over portion 16 is glued to the upstanding wall 12 by means of a strip of hot-melt adhesive 18. Application of heat to the folded-over portion 16, accompanied by pressure to hold the folded-over portion 16 flat against the wall 12, causes the folded-over portion 16 to adhere to the wall 12** to form a folded-over, reinforced portion of double thickness.

In a preferred form of the invention, the folded-over portion 16 has cut-out portions 20, advantageously, of triangular shape, with the bases 22 generally parallel with the edge 24 of the reinforced portion, and with the apex 26 adjacent to but spaced from the edge 24. Alternatively, the folded-over portion 16 may have cut portions 28 which, too, advantageously, are triangular in shape and oriented as the triangular cut-out portions 20. These portions are cut along the legs 30 of the triangle, leaving the base 32 intact. The cut-out portions 20 and the cut portions 30 constitute areas of weakness, the purpose of which will be described hereinafter.

The open end of the container is closed by a friction-type closure preferably made of a plastic material, advantageously, a thermoplast. It comprises a top member 34 having an upstanding tubular inner wall 36 shaped to frictionally engage the inner surface of the folded-over portion 16 of the container wall 12. If desired, the closure member 34 may have a centrally-located upwardly-domed portion 38, the outer wall 40 of which is spaced from the upstanding wall 36 to form a tubular channel 42 adapted to receive portions of the fastening mechanism yet to be described.

Figure 5:
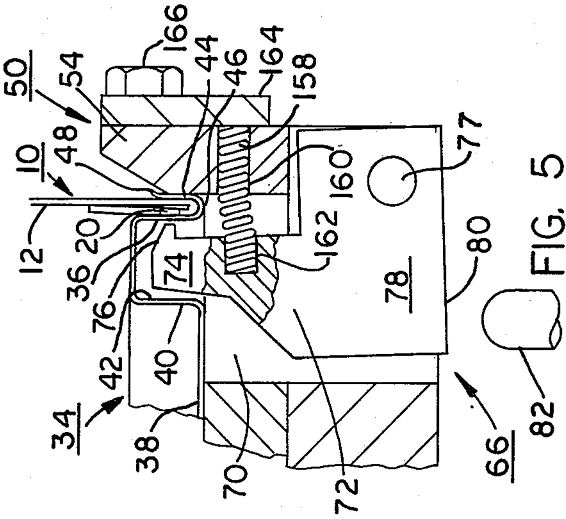
FIG. 5 is a partial view of FIGS. 3 and 4.

The closure member 34 also has a downstanding tubular outer wall 44 connected to the upstanding wall 36 by a bight 46. The downstanding wall 44 is shaped to frictionally engage the outer surface of the container wall 12 and forms with the downstanding wall 36 a tubular channel which receives the folded-over, reinforced portion 16 in frictional engagement, as shown in FIG. 5. The downstanding outer wall 44 has an outwardly-flaring portion 48 to facilitate placing the closure member 34 on the container wall 12.

In this modification of the invention, the machine comprises a fastening head 50 having a dish-shaped positioning member 52 having an upstanding tubular wall 54 and a yoke 56 fastened to the bottom thereof. The upstanding tubular wall 54 has a vertical portion 58 conforming in shape and size to the downstanding tubular outer wall 44 of the closure member 34 so that, when the container closure member 34 is seated in positioning member 52, the downstanding tubular outer wall is juxtaposed to the vertical portion 58 of the upstanding wall 54 for a purpose to be more fully described. The upstanding wall 54 has a flared-out portion 60 for the purpose of guiding the closed container into the positioning member 52, that is, into the position shown in FIG. 5.

The yoke member 56 comprises a plurality of yokes 62, two of which are disposed on each side and one on each end, as shown in FIG. 9. The yokes 62 have transverse bores 64 for receiving pivot pins on which are to be mounted the fingers 66. The bottom 68 of the positioning member 52 is provided with apertures 70 conforming essentially to the shape of the yokes 62, through which apertures an arm 72 projects axially upwardly as part of the fingers 66.

Figure 6:
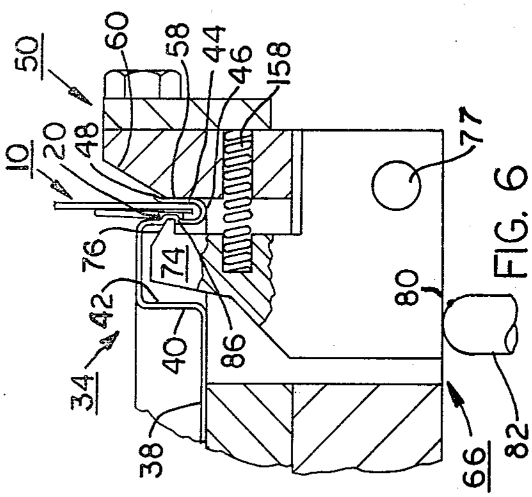
FIG. 6 is a partial view of FIGS. 1 and 2.
Figure 3:
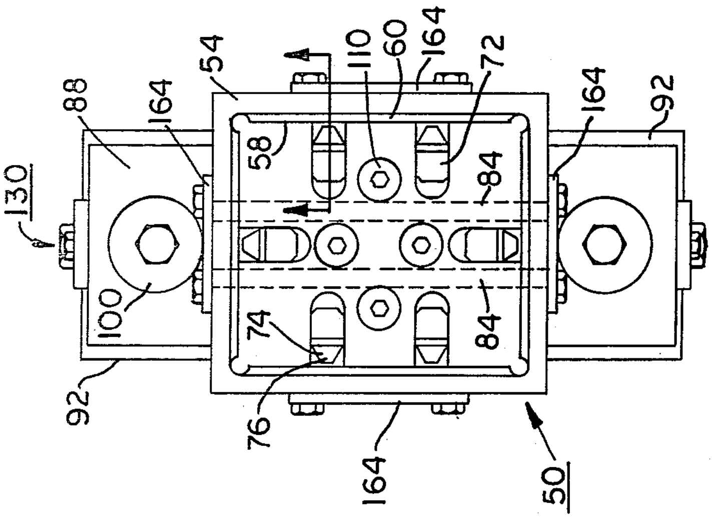
FIG. 3 is a top view of FIGS. 1 and 2 in the retracted position.

At the upper end of the axial arm 72 are punching heads 74, the punching points 76 of which are apposed to the vertical portions 58 of the wall 54 and apposed to the upstanding wall 36 of the closure member 34 when the container is seated in the positioning means 52, as shown in FIGS. 5 and 6. The fingers 66 are pivoted on transverse pivot rods extending through transverse bores 64, which are located so that the pivot pins 77 are in line with the upstanding wall 54. Fingers 66 are "L" shaped and comprise the axial arm 72 and the transverse arm 78. The transverse arm 78 has a flat horizontal portion 80 adjacent the inner edge which is adapted to be engaged by an actuating rod 82 which functions to cause the fingers 66 to rotate about the pivot 77 and to force the punching points 76 into punching contact with the upstanding wall 36 against the vertical portion 58 of the upstanding wall 54, which vertical portion functions as an anvil for the punching points 76 to punch against. The punching head 74 tapers to the punching points 76, as shown in FIGS. 3, 5, and 6. When the closed container is seated in the positioning member 52, the punching points 76 are opposite the cut-out portions 20, as shown in FIGS. 5 and 6 and, when the punching head 74 is actuated by the actuating rods 82, the punching points 76 punch the portion of the upstanding wall 36 of the cover member 34 into the cut-out portions 20, as shown in FIG. 6.

The positioning member 52 is provided with transverse bores which extend transversely across the bottom 68. In these transverse bores are located heating elements 84 which function to heat the fastening head 50, so that the punching head 74 and punching points 76 become hot enough to heat-deform the upstanding inner wall 36 into the cut-out portion 20. The punching point 76 will punch the upstanding inner wall 36 into contact with the wall 12 of the container and into contact with the hot-melt adhesive 18 which was applied to the wall 12 to cause the folded-over portion 16 to adhere thereto.

When cut-weakened portions 28 are used, the hot punching points 76 will force the triangular tabs of the cut portions back against the container wall 12 which is held firmly against the vertical anvil portion 58, whereupon hot-melt adhesive will be forced through the cuts 30 into contact with the heat-deformed portion 86 and cause it to adhere to the cut portion 28.

The fastening head 50 is mounted on a first transverse platform 88 which is mounted for reciprocation on the vertical rods 90 which are mounted on a fixed base 92 in collars 94 welded thereto. The first transverse platform 88 is provided with bushings 96 to facilitate its sliding up and down on the rods 90 and is prevented from going off the top of the rods by stops comprising the washer 100 and the bolt 102.

For the purpose of this mounting, the positioning member 52 and the yokes 56 are provided with a plurality of axial bores 104 and 106 for receiving the bolts 108. The heads 110 are countersunk to be flush with the bottom 68. The bolts 108 are threaded into the first transverse platform 88, as shown at 112, and pass through spacers 114 for the purpose of keeping the yoke member 56 out of contact with the first transverse platform 88 to minimize heat transfer thereto. If desired, the spacers 114 and the bolts 110 can be constructed of material such as nylon, which has relatively-low heat-transfer properties.

A second transverse platform 116 is mounted for reciprocation on the rods 90. It has affixed thereto depending tubular members 118 which are provided with upper and lower bushings 120 and 122, leaving between them space 124 into which a lubricant can be introduced through the fitting 126.

Between the two transverse platforms 88 and 116 are spring members 128 which tend to force the second transverse platform 116 downwardly away from the first transverse platform 88. A lost-motion connection 130 connects the two platforms together. This comprises plates 132 affixed to the first platform 88 by bolts 134. The plates at the bottom end have an elongated slot 136 through which the bolts 138 project into the second platform 116, but are not tightened down, so that the plate 132 has limited motion relative to the second transverse platform 116, and vice versa.

Fastened to the second transverse platform 116 are the actuating rods 82. They are adapted to screw into the second transverse platform 116, as shown at 140, for the purpose of adjusting the effective length thereof, and are provided with lock nuts 142.

Between the base member 92 and the second transverse platform 16 is pressure-fluid cylinder 144, the cylinder of which is fastened to the base member 92 by a tenon 146 pivoted in the yoke 148 by pivot pin 150. The piston rod is affixed to the second transverse platform 116. Suitably, it has a threaded end 154 which is threaded into the second transverse platform 116 and secured thereto by lock nut 156.

Figure 4:
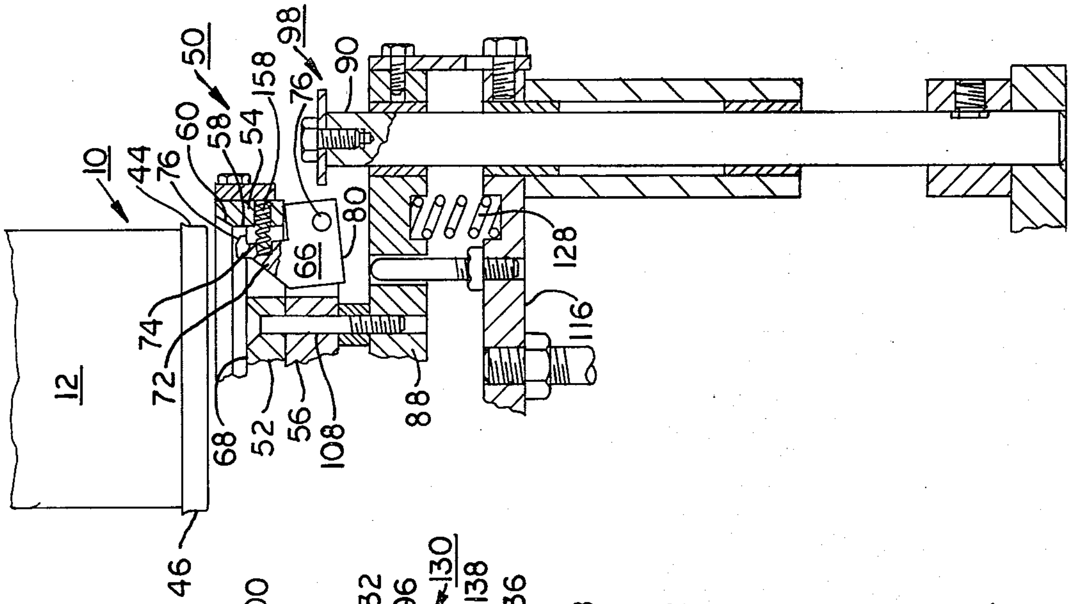
FIG. 4 is a partial view corresponding to FIG. 1, but showing the retracted position.

The fingers 66 are spring-pressed to retracted position, as shown in FIGS. 4 and 5 by means of spring members 158 which pass through bores 160 in wall 54 into a shallow bore 162. These spring members are held in position by plates 164 bolted to the upstanding wall 54 by bolts 166.

In the operation of the above-described machine, a container 12, with its closure member 34 down, is positioned above the fastening head 50 by a suitable conveyor and/or positioning means, not shown in the position shown in FIG. 4. The fluidpressure cylinder 144 is now actuated, causing the two platforms 88 and 116 to move upwardly as a unit. This causes the positioning member 52 to move up around the closure member 34 to the position shown in FIG. 5, in contact with the domed portion 38 and with the downstanding tubular outer wall 44 of the cover member 34 engaged against the vertical anvil portion 58 and with the punching points 76 apposed to the upstanding tubular inner wall 36 and opposite the cut-outs 20.

As further upward movement of the first transverse platform 88 is terminated by the stop means 98, further upward movement is now confined to platform 116. This causes the actuating rods 82 to move up into contact with the flat portion 80 of the fingers 66. Further upward movement then causes the fingers 66 to rotate about their pivots 77 and to force the punching points 76 into the upstanding tubular inner wall 36, as shown in FIG. 6, where they are held until a heat set is obtained in the deformed portion 86 and a seal is effected between the deformed portion 86 and the hot-melt adhesive 18 in the cut-out portion 20.

Then, the operation is reversed to the position shown in FIG. 4, whereupon the spring 158 moves the punching head 74 radially inwardly and withdraws the punching point 76 from engagement with the upstanding tubular inner wall 36 and the container 12, with its closure member 34 thus fastened thereon, is moved out of position and a new unfastened container moved in. After the closure member has been fastened in place, the container is moved onto a filling station where it is filled with ice cream, or the like, and the bottom then closed in a manner already known in the art.

In the modification shown in FIGS. 10 and 11, the fastening is effected with the cover member uppermost. In this modification, the fastening head 252 is constructed as the fastening head 52 or machined from a single unitary casting. The fingers 266 have essentially the same configuration as the fingers 66 and are pivoted on transverse rods 276.

The fastening head 252 has lateral extensions mounted for reciprocal motion on vertical rods 170, which project upwardly from the walls 172 from the container-positioning device 174. The walls 172 have adjustable plates 176 which can be adjusted to the width of the container and to align it with the positioning head 252. The walls 172 are affixed to a fixed base 292.

Projecting upwardly from the fastening head 252 and integral therewith is a tubular member 176. Surrounding this tubular member is a sleeve 178 having a lost-motion connection with the tubular member 176 by the slots 180 and pins 182. The sleeve 178 forms one leg of a parallelogram lifting device comprising an upstanding member 186 and two parallel transverse members 188 and 190. Between the parallel member 190 and the base 292 is a fluid-pressure cylinder 244, fixed to the base in the same manner as in FIG. 1 and affixed to the parallel member 190 by yoke 192. Two parallel members 190 are affixed to member 186 and sleeve 178 and the yoke is fastened between the two by pivot pin 194 extending through both.

Figure 1:
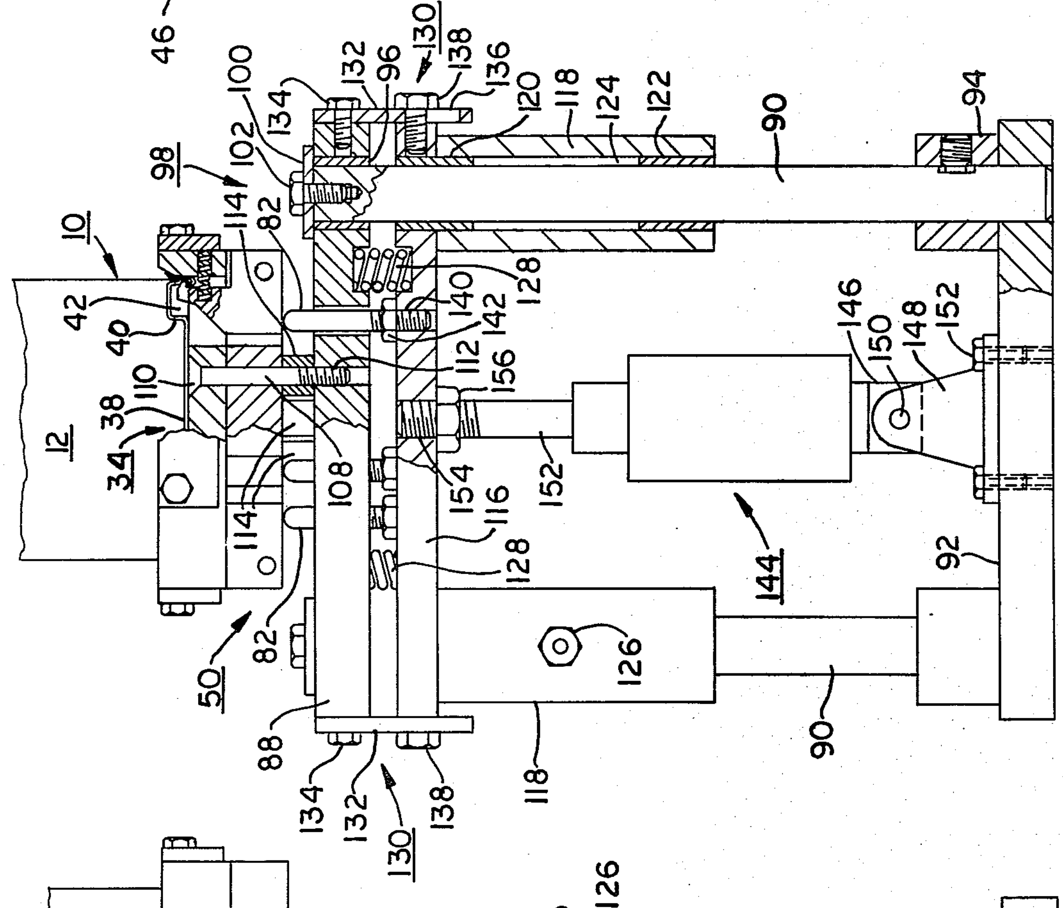
FIG. 1 is a front elevation in partial section in the fastening position.
Figure 2:
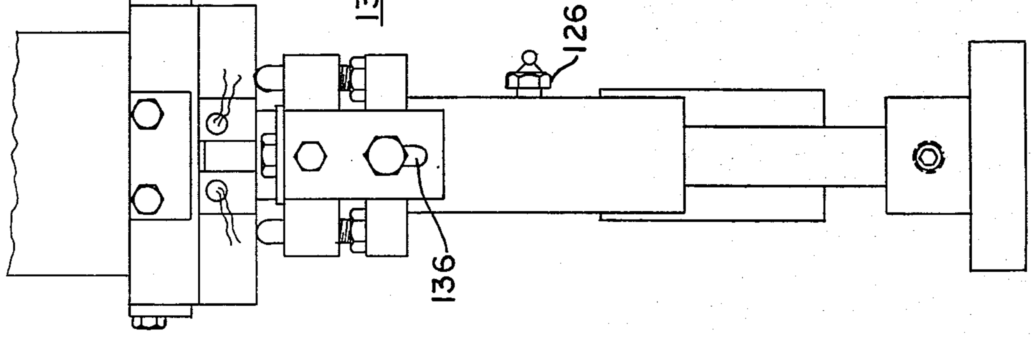
FIG. 2 is a side elevation of FIG. 1.

The sleeve 178 has a flange 196 onto which the actuating rods 282 are threaded as in FIG. 1. Spring means 198 is located around the tubular member 176 and functions to actuate the fastening head 252.

When the fluid-pressure cylinder 244 is actuated, the sleeve 178 and rod 176 move as a unit until the fastening head 252 is seated on the container and the extensions 168 are seated on the top of the sides 172. Further downward movement of the sleeve 178 compresses spring means 198 and allows the actuating bolts 282 to move the fingers 266 into punching position, as shown in FIGS. 10 and 11.

The tubular member 176 has an inner rod 198 extending down to a displacing head 200. A spring member 202 is disposed between the displacing head 200 and the bottom of the tubular member 176 to urge the displacing head 200 downwardly. An adjustable stop 204 is provided at the top of the rod to limit the extent of the downward movement of the displacing head 200. When the fastening head 252 is brought down into contact with the container, the displacing head 200 first engages the domed portion of the closure member and the spring member 202 is compressed, raising the adjustable stop 204 to a position above the top of the tubular member 176. Then, when the action is reversed, the displacing member acts to push the container out of engagement with the fastening head 252.

In this modification, heating elements 206 are in axial bores in the fingers 266 and extend in to the punching points 296 to effect the desired heating thereof.

It will be understood that this type of means for heating the punching heads can be substituted in the modification of FIGS. 1 through 8 for the transverse bores 84 and the heating elements therein.

In this modification, the container can be filled either before or after the closure member has been fastened in place. In the latter case, the container, after the closure member has been fastened in place, is inverted and moved on to the filling station where it is filled and the bottom closed, as in the first-described modification.

The invention thus provides a process and apparatus for fastening a closure member to a container with an upstanding tubular wall, an end edge of which is folded over onto itself to form a folded-over reinforced portion of double thickness at that end, the closure member having an upstanding tubular inner wall conforming to the inner surface of the folded-over, reinforced portion, and a downstanding tubular outer wall connected thereto and conforming to the outer surface of the folded-over, reinforced portion, thereby forming a tubular channel in which the folded-over reinforced portion is seated in frictional engagement, in which the end of the container which is closed with the closure member is placed in a position juxtaposed to a fastening head and anvil means, a relative movement of the container is effected with respect to the fastening head and anvil means to seat the fastening head on the closed end of the container with the upstanding tubular inner wall apposed to the fastening head and the downstanding tubular outer wall juxtaposed to the anvil means, and in which the fastening head is then actuated to fasten the upstanding tubular inner wall to the inner surface of the foldedover, reinforced portion by pressing selected portions of the upstanding tubular inner wall into the inner surface of the folded-over, reinforced portion against anvil means apposed to the selected portions.

While the apparatus of the present invention and the method of the invention have been described without reference to any pre-existing lugs, fingers, detents, prongs, indentations, or other impressions in the upstanding innner wall of any closure member desired to be processed in the apparatus or according to the method of the invention, it is of course to be understood that the existence of any such further elements or areas in the said upstanding inner wall at pre-selected places, at which the fastening head of the apparatus or the fastening step of the method of the present invention are operative, generally in no way detracts but rather facilitates the attainment of the desired results and objectives according to the present invention.

For a specific type of container particularly utilizable in the apparatus and according to the method of the present invention, reference is made to the co-pending application of Thomas VanderLugt, Ser. No. 71,242, filed even date herewith.

It is to be understood that the invention is not to be limited to the exact details of operation or structure shown and described, as obvious modifications and equivalents will be apparent to one skilled in the art.

I claim:

1. A machine useful for fastening a closure member to a container with an upstanding tubular wall, an edge of which is folded over onto itself to form a folded-over, reinforced portion of double thickness at that end, said closure member having an upstanding tubular inner wall conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which machine comprises:

a fastening head;

anvil means;

positioning means for positioning said fastening head and said anvil means in fastening position with the downstanding tubular outer wall of said channel juxtaposed to said anvil means and with the upstanding tubular inner wall of said channel apposed to said fastening head; and, actuating means for actuating said fastening head, while it is in fastening position, to fasten the upstanding inner tubular wall of said channel to the inner surface of said folded-over, reinforced portion, said fastening head comprising means for pressing selected portions of the upstanding tubular inner wall of said channel into the inner surface of said folded-over, reinforced portion against anvil means apposed to said selected portions; in which said fastening head comprises a plurality of punching points arranged about the periphery of said fastening head, and said actuating means comprises punching means for causing said punching points to move radially outwardly and to punch the upstanding tubular inner wall of said tubular channel into the inner surface of the folded-over, reinforced portion of the upstanding tubular wall of said container; and in which the inner surface of the folded-over, reinforced portion of the upstanding tubular wall of said container has areas of low resistance to the punching-in of the upstanding tubular inner wall of said tubular channel, which areas of low resistance are opposite said punching points and as to which said punching means is operative to punch the portions of said upstanding tubular inner wall which are are apposed to said areas of low resistance into the same.

2. A machine according to claim 1, in which said areas of low resistance comprise cut-out areas in the inner layer of said folded-over, reinforced portion.

3. A machine according to claim 1, in which said areas of low resistance comprise cut areas in the inner layer of said folded-over, reinforced portion.

4. A machine according to claim 1, which further comprises heating means for heating said punching points.

5. A machine according to claim 1, in which said positioning means comprises a dish-shaped member having an inner wall complementary in shape to said downstanding tubular outer wall and functioning, first, to position said container and, second, as anvil means.

6. A machine according to claim 3, in which said fastening head is mounted on a vertically reciprocable platform and in which said positioning means comprises reciprocable means for causing said platform to reciprocate.

7. A machine according to claim 6, in which said reciprocable means is double acting, acting first to move said reciprocable platform into a position in which said fastening head is disposed in said dish-shaped member and then to move said actuating means.

8. A machine according to claim 7, in which said actuating means is mounted on a second reciprocable platform separated from the first named said reciprocable platform by spring means and in which said reciprocable means acts directly on the second named platform and indirectly through said spring means on said first named reciprocable platform.

9. A machine useful for fastening a closure member to a container with an upstanding tubular wall, an edge of which is folded over onto itself to form a folded-over, reinforced portion of double thickness at that end, said closure member having an upstanding tubular inner wall conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which machine comprises:

a fastening head;

anvil means;

positioning means for positioning said fastening head and said anvil means in fastening position with the downstanding tubular outer wall of said channel juxtaposed to said anvil means and with the upstanding tubular inner wall of said channel apposed to said fastening head; and, actuating means for actuating said fastening head, while it is in fastening position, to fasten the upstanding inner tubular wall of said channel to the inner surface of said folded-over, reinforced portion, said fastening head comprising means for pressing selected portions of the upstanding tubular inner wall of said channel into the inner surface of said folded-over, reinforced portion against anvil means apposed to said selected portions; in which said fastening head comprises a plurality of punching points arranged about the periphery of said fastening head, and said actuating means comprises punching means for causing said punching points to move radially outwardly and to punch the upstanding tubular inner wall of said tubular channel into the inner surface of the folded-over, reinforced portion of the upstanding tubular wall of said container; in which each of said punching points is mounted adjacent the free end of a pivoted arm; in which each said arm is pivoted adjacent the periphery of said fastening head and has a portion extending radially to said punching points; in which each of the pivoted arms comprises a crank adapted to be engaged by said actuating means; and in which said crank means comprises a flat surface which extends radially inwardly from the pivot point and which is adapted to be engaged by said punching means.

10. A machine according to claim 9, in which said punching means comprises axially-reciprocable rods.

11. A machine useful for fastening a closure member to a container with an upstanding tubular wall, an edge of which is folded over onto itself to form a folded-over, reinforced portion of double thickness at that end, said closure member having an upstanding tubular inner wall conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which machine comprises:

a fastening head;

anvil means;

positioning means for positioning said fastening head and said anvil means in fastening position with the downstanding tubular outer wall of said channel juxtaposed to said anvil means and with the upstanding tubular inner wall of said channel apposed to said fastening head; and, actuating means for actuating said fastening head, while it is in fastening position, to fasten the upstanding inner tubular wall of said channel to the inner surface of said folded-over, reinforced portion, said fastening head comprising means for pressing selected portions of the upstanding tubular inner wall of said channel into the inner surface of said folded-over, reinforced portion against anvil means apposed to said selected portions; in which said fastening head comprises a plurality of punching points arranged about the periphery of said fastening head, and said actuating means comprises punching means for causing said punching points to move radially outwardly and to punch the upstanding tubular inner wall of said tubular channel into the inner surface of the folded-over, reinforced portion of the upstanding tubular wall of said container; in which each of said punching points is mounted adjacent the free end of a pivoted arm; in which each said arm is pivoted adjacent the periphery of said fastening head and has a portion extending radially to said punching points; in which each of the pivoted arms comprises a crank adapted to be engaged by said actuating means; in which said crank means comprises a flat surface which extends radially inwardly from the pivot point and which is adapted to be engaged by said punching means; in which said punching means comprises axially-reciprocable rods; and in which said fastening head comprises a positioning portion having a transverse bottom and a side wall extending upwardly therefrom, said side wall being complementary in size and shape to the downstanding tubular outer wall of said tubular channel, so that the closure member fits therein and is supported against radial movement, and a mounting portion below the positioning portion having a plurality of yokes in which said arms are pivoted, said mounting portion having a plurality of axially-disposed apertures through which said arms extend axially to said punching points.

12. A machine according to claim 11, in which said fastening head is mounted on a transverse, axially-reciprocable platform, in which said reciprocable rods are mounted on a second transverse, axially-reciprocable platform and project axially through the first-named platform, in which the two platforms are spearated by spring means, and in which said positioning means comprises an axially-reciprocable member fastened to said second-named platform and operative to cause it to reciprocate axially, said spring means functioning to cause the two platforms to move as a unit until the positioning portion of the fastening head has engaged the container and thereafter to allow the second-named platform to continue the axial movement until said rods have engaged the flat surface of said crank and caused said arms to rotate about their pivots and to cause the punch points on said arms to punch said upstanding tubular inner wall into the inner surface of said folded-over, reinforced portion.

13. A machine according to claim 12, in which said mounting portion of the fastening head has bores in which are disposed heating elements.

14. A machine according to claim 12, in which said arms have axial bores in which are disposed heating elements.

15. A machine according to claim 12, in which said platforms are mounted to reciprocate on axially-disposed rods affixed to a base member and in which said actuating means comprises a fluid-pressure cylinder acting between said base member and said second-named platform.

16. A machine according to claim 15, in which the two platforms are connected together by means of a lost-motion connection whereby, when the fluid-pressure cylinder is actuated to retracted position, it will positively retract the first-named platform and positively withdraw the positioning portion from engagement with said container.

17. A machine according to claim 16, in which the punching points are spring-actuated to retracted position.

18. A machine according to claim 15, in which the last-named platform has tubular members affixed adjacent the ends thereof which surround said axially-disposed rods, said tubular members having sealing bushings at each end and means whereby a lubricant can be introduced into the space between said bushings.

19. A machine useful for fastening a closure member to a container with an upstanding tubular wall, an edge of which is folded over onto itself to form a folded-over, reinforced portion of double thickness at that end, said closure member having an upstanding tubular inner wall conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which machine comprises:

a fastening head;

anvil means;

positioning means for positioning said fastening head and said anvil means in fastening position with the downstanding tubular outer wall of said channel juxtaposed to said anvil means and with the upstanding tubular inner wall of said channel apposed to said fastening head; and, actuating means for actuating said fastening head, while it is in fastening position, to fasten the upstanding inner tubular wall of said channel to the inner surface of said folded-over, reinforced portion, said fastening head comprising means for pressing selected portions of the upstanding tubular inner wall of said channel into the inner surface of said folded-over, reinforced portion against anvil means apposed to said selected portions; in which said fastening head comprises a plurality of punching points arranged about the periphery of said fastening head, and said actuating means comprises punching means for causing said punching points to move radially outwardly and to punch the upstanding tubular inner wall of said tubular channel into the inner surface of the folded-over, reinforced portion of the upstanding tubular wall of said container; in which each of said punching points is mounted adjacent the free end of a pivoted arm; in which each said arm is pivoted adjacent the periphery of said fastening head and has a portion extending radially to said punching points; in which each of the pivoted arms comprises a crank adapted to be engaged by said actuating means; in which said crank means comprises a flat surface which extends radially inwardly from the pivot point and which is adapted to be engaged by said punching means; in which said punching means comprises axially-reciprocable rods; and in which said fastening head comprises a positioning portion having a transverse bottom and a side wall extending downwardly therefrom, said side wall being complementary in size and shape to the downstanding tubular outer wall of said closure member and positions the same against radial movement and functions as said anvil means, said fastening head being mounted at the bottom of a vertical column and for reciprocation up and down relative to a base member, said vertical column having a sleeve reciprocable thereon and affixed thereto by a lost-motion connection, said axially-reciprocable rods being fastened to said sleeve, and said sleeve being actuated to reciprocate by means of a fluid-pressure cylinder which operates through a parallelogram, one leg of which is said sleeve.

20. A machine according to claim 19, in which said column comprises a centrally-disposed, axially-reciprocable rod adapted to be actuated to push the container from said positioning portion in the event that it does not automatically release when said column is retracted.

21. A machine according to claim 19, which further comprises container-positioning means for positioning a container under said fastening head in position for said positioning portion to be lowered onto the closed end thereof.

22. A process for fastening a closure member to a container with an upstanding tubular wall, an edge of which is folded over onto itself to form a folded-over, reinforced portion of double thickness at that end, said closure member having an upstanding tubular inner wall conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which process comprises:

positioning the end of said container which is closed with said closure member in a position juxtaposed to a fastening head and anvil means;

effecting a relative movement of said container with respect to said fastening head and said anvil means operative to seat said fastening head on the closed end of said container with said upstanding tubular inner wall apposed to said fastening head and said downstanding tubular outer wall juxtaposed to said anvil means, and then actuating said fastening head to fasten said upstanding tubular inner wall to the inner surface of said folded over, reinforced portion by pressing selected portions of said upstanding tubular inner wall into the inner surface of said folded-over, reinforced portion against anvil means apposed to said selected portions; in which the fastening of said closure member is effected by punching-in portions of said upstanding tubular inner wall into the inner surface of said folded-over, reinforced portion; and in which the inner surface of said folded-over, reinforced portion has preformed areas of low resistance to the punching-in of said upstanding tubular inner wall into which corresponding portions of said upstanding tubular inner wall are punched.

23. A process according to claim 22, in which said areas of low resistance comprise cut-out areas in the inner layer of said folded-over, reinforced portion.

24. A process according to claim 22, in which said areas of low resistance comprise cut areas in the inner layer of said folded-over, reinforced portion.

25. A process according to claim 22, in which the closure member is formed of a thermoplast and the punching is effected with a hot punch, whereby the punched-in portions of said upstanding tubular inner wall are heat-deformed.

26. A process according to claim 22, which comprises the further step of gluing the punched-in portions in said areas of low resistance.

27. A process according to claim 26, in which the gluing step is effected by heating a hot-melt adhesive which was predeposited in said areas of low resistance, the heating of said adhesive being effected by the same hot punch used to heat-deform the closure member into said areas of low resistance.

28. A process according to claim 22, in which the container is positioned under the fastening head with the closure member up, the head lowered onto the closed end, said anvil means placed against the downstanding tubular outer wall opposite each area of low resistance, and said upstanding tubular inner wall punched into the said areas of low resistance against said anvil means.

29. A process according to claim 22, in which the container is positioned over the fastening head with the closure member down, the head raised onto the closed end, said anvil means placed against the downstanding tubular outer wall opposite each area of low resistance, and said upstanding tubular inner wall punched into the said areas of low resistance against said anvil means.

30. A machine useful for fastening a closure member to a container with an upstanding, fiberboard tubular wall, an edge of which is folded over onto itself to form a folded-over, reinforced portion of double thickness at that end, said closure member having an upstanding tubular inner wall of light plastic material conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which machine comprises:

a fastening head;

anvil means;

positioning means for positioning said fastening head and said anvil means in fastening position with the downstanding tubular outer wall of said channel juxtaposed to said anvil means and with the upstanding tubular inner wall of said channel apposed to said fastening head; and, actuating means for actuating said fastening head, while it is in fastening position, to fasten the upstanding inner tubular wal of said channel to the inner surface of said folded-over, reinforced portion, said fastening head comprising punch means for punching-in isolated portions of the upstanding tubular inner wall of said channel into the inner surface of said folded-over, reinforced portion against anvil means apposed to said selected portions; and, in which said punch means comprises a plurality of blunt, taper-pointed, punching points arranged at spaced intervals about the periphery of said fastening head, and said actuating means comprises punching means for causing said punching points to move radially outwardly and to punch-in said isolated portions into the inner surface of the folded-over, reinforced portion of the upstanding tubular wall of said container.

31. A machine of claim 30 in which each of said punching points is mounted adjacent the free end of a pivoted arm; in which each said arm is pivoted adjacent the periphery of said fastening head and has a portion extending radially to said punching points; in which each of the pivoted arms comprises a crank adapted to be engaged by said actuating means; and in which said crank means comprises a flat surface which extends radially inwardly from the pivot point and which is adapted to be engaged by said punching means.

32. A process for fastening a closure member to a container with an upstanding, fiberboard tubular wall, an end edge of which is folded over onto itself to form a folded-over, reinforced portion of double thickness at that end, said closure member having an upstanding tubular inner wall of thin plastic material conforming to the inner surface of said folded-over, reinforced portion and a downstanding tubular outer wall connected thereto and conforming to the outer surface of said folded-over, reinforced portion, thereby forming a tubular channel in which said folded-over, reinforced portion is seated in frictional engagement, which process comprises:

positioning the end of said container which is closed with said closure member in a position juxtaposed to a fastening head and anvil means;

effecting a relative movement of said container with respect to said fastening head and said anvil means operative to seat said fastening head on the closed end of said container with said upstanding tubular inner wall apposed to said fastening head and said downstanding tubular outer wall juxtaposed to said anvil means, and then actuating said fastening head to fasten said upstanding tubular inner wall to the inner surface of said folded-over, reinforced portion by punching-in isolated portions of said upstanding tubular inner plastic wall into the fiberboard of the inner surface of said folded-over, reinforced portion against anvil means apposed to said selected portions.

* * * * *

UNITED STATES PATENT AND TRADEMARK OFFICE
CERTIFICATE OF CORRECTION

PATENT NO. : 4,293,354

DATED : October 6, 1981

INVENTOR(S) : Richard G. Haas

It is certified that error appears in the above—identified patent and that said Letters Patent is hereby corrected as shown below:

Col. 6, line 59; "pins" should read -- points --
Col. 10, line 9; "foldedover" should read -- folded-over --
Col. 10, line 24; "detracts but" should read -- detracts from but --
Col. 16, line 35; "wal" should read -- wall --

Signed and Sealed this

***Ninth* Day of *February 1982***

[SEAL]

*Attest:*

GERALD J. MOSSINGHOFF

*Attesting Officer* *Commissioner of Patents and Trademarks*